United States Patent [19]

Inoue et al.

[11] Patent Number: 4,681,997
[45] Date of Patent: Jul. 21, 1987

[54] WIRE-CUT, ELECTRIC DISCHARGE MACHINING POWER SUPPLY UNIT

[75] Inventors: Michiya Inoue, Hino; Haruki Obara, Sagamihara; Shunzo Izumiya, Hachioji, all of Japan

[73] Assignee: Fanuc Ltd, Minamitsuru, Japan

[21] Appl. No.: 744,486

[22] PCT Filed: Oct. 11, 1984

[86] PCT No.: PCT/JP84/00478
§ 371 Date: Jun. 10, 1985
§ 102(e) Date: Jun. 10, 1985

[87] PCT Pub. No.: WO85/01685
PCT Pub. Date: Apr. 25, 1985

[30] Foreign Application Priority Data

Oct. 12, 1983 [JP] Japan ................................. 58-157839

[51] Int. Cl.⁴ ................................................ B23H 1/02
[52] U.S. Cl. ................................. 219/69 C; 219/69 P; 323/287
[58] Field of Search ................. 219/69 C, 69 P, 69 R, 219/68; 323/287

[56] References Cited

U.S. PATENT DOCUMENTS

| | | | |
|---|---|---|---|
| 2,835,784 | 5/1958 | Williams | 219/69 P |
| 3,549,851 | 12/1970 | Hockenberry | 219/69 C |
| 3,745,444 | 7/1973 | Calkin et al. | 323/287 |
| 4,034,281 | 7/1977 | Morita et al. | 323/287 |

FOREIGN PATENT DOCUMENTS

| | | | |
|---|---|---|---|
| 46-24674 | 7/1971 | Japan | 219/69 C |
| 53-85596 | 7/1978 | Japan | 219/69 P |
| 56-21728 | 2/1981 | Japan | 219/69 C |
| 57-184629 | 11/1982 | Japan . | |
| 865580 | 9/1981 | U.S.S.R. | 219/69 P |
| 925496 | 8/1982 | U.S.S.R. | 219/69 P |

OTHER PUBLICATIONS

International Search Report, completed Dec. 4, 1984, by Japanese Patent Office.

Primary Examiner—A. D. Pellinen
Assistant Examiner—Geoffrey S. Evans
Attorney, Agent, or Firm—Staas & Halsey

[57] ABSTRACT

A wire-cut, electric discharge machining power supply unit charges a capacitor (4) by a DC power source (2) via a switching element (1), and discharges the stored charges of the capacitor (4) between a workpiece (6) and a wire electrode (7) via another switching element (5). A single-polarity discharge current of a small pulse width is supplied between the wire electrode (7) and the workpiece (6). A series circuit of an impedance element (50, 80) other than a capacitance and a diode (51), is connected in a backward direction with respect to a capacitor charging voltage to effect recharging of the capacitor (4) with high efficiency.

5 Claims, 11 Drawing Figures (a) (b) (c)

WIRE-CUT, ELECTRIC DISCHARGE MACHINING POWER SUPPLY UNIT

TECHNICAL FIELD

The present invention relates to a wire-cut, electric discharge machining power supply unit which is able to increase the cutting speed in wire-cut, electric discharge machining.

BACKGROUND ART

Wire-cut, electric discharge machining is employed to effect machining by discharging, between a wire electrode and a workpiece, charges stored in a capacitor. Conventionally, for example, as shown in FIG. 1, a transistor 1 is turned ON and OFF by drive pulses from a control circuit (not shown,) and when the transistor 1 is in the ON state, a capacitor 4 is charged by a DC power source 2 via a resistor 3. By turning ON a transistor 5, the stored charges are discharged between a workpiece 6 and a wire electrode 7. In FIG. 1, reference numeral 8 indicates a contact piece, 10 a diode for protecting the transistor 5 from a reverse breakdown voltage, 11 a stray inductance of a wire or the like, and 12 and 13 resistors for detecting the charging voltage of the capacitor 4 by dividing it.

With the wire-cut, electric discharge machining power supply unit shown in FIG. 1, the capacitor 4 is charged, by current flow from the workpiece 6 to the wire electrode 7, in a direction reverse from that in which it was charged by the DC power source, for example, as indicated by a waveform $V_C$ in FIG. 2(a). On this account, during discharging a current flows form the wire electrode 7 to the workpiece 6, resulting in a discharge current between the wire electrode 7 and the workpiece 6 containing a + direction component and a relatively large − direction component, for example, as indicated by a waveform $I_G$ in FIG. 2 (a). It is desired that the − direction component be as small as possible since it causes wear of the wire electrode 7 and leads to unstable cutting. One possible technique that is considered to meet this requirement is to isert a diode 20 in a backward direction with respect to the − direction component (as shown in FIG. 3) so as to cut the − direction component as indicated by a waveform $I_G$ in FIG. 2(b). With such an arrangement, however, after being discharged, the capacitor 4 is greatly charged in the polarity reverse from that in which it was charged by the DC power source, as indicated by a waveform $V_C$ in FIG. 2(b), and the total sum of currents required for recharging the capacitor 4 increases, thereby decreasing the cutting efficiency (the amount of cutting-/current). It is also possible to connect a diode 30 in parallel to the capacitor 4, as shown in FIG. 4, so as to prevent it from being charged in the polarity reverse from that in which it was charged by the DC power source. With this arrangement, however, the gap current $I_G$ varies from the broken line curve to the solid line one in FIG. 2(c) and the discharge drags on, causing a substantial increase in the pulse width of the discharge current. In wire-cut, electric discharge machining, it is necessary that the pulse width of the discharge current (the pulse width of the + direction component) be as small as several microseconds or less. Therefore the arrangement of FIG. 4 introduces the defect that the discharge will become rather unstable.

SUMMARY OF THE INVENTION

An object of the present invention is to provide a wire-cut, electric discharge machining power source unit which supplies a single-polarity discharge current of a small pulse width across the wire electrode and the workpiece, and which raises the capacitor recharging efficiency, thereby increasing the cutting speed.

According to the present invention, in the wire-cut, electric discharge machining power supply unit which charges a capacitor by a DC power source via a switching element, and discharges the stored charges of the capacitor between the workpiece and the wire electrode via another switching element, a series circuit of an impedance element, other than a capacitance, and a diode, is connected in parallel to the capacitor, and the diode is connected in a backward direction relative to the capacitor charging current.

DESCRIPTION OF THE PREFERRED EMBODIMENT

Figure 1:
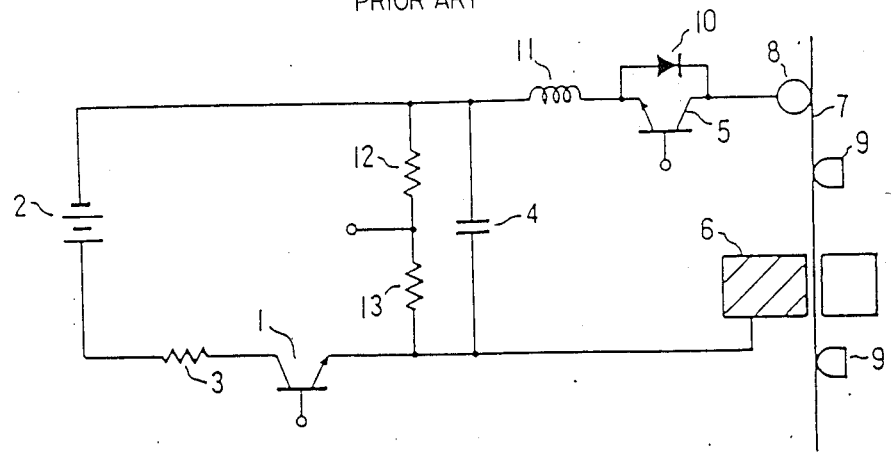
FIGS. 1, 3 an 4 are circuit diagrams of conventional wire-cut, electric discharge machining power supply units.
Figure 5:
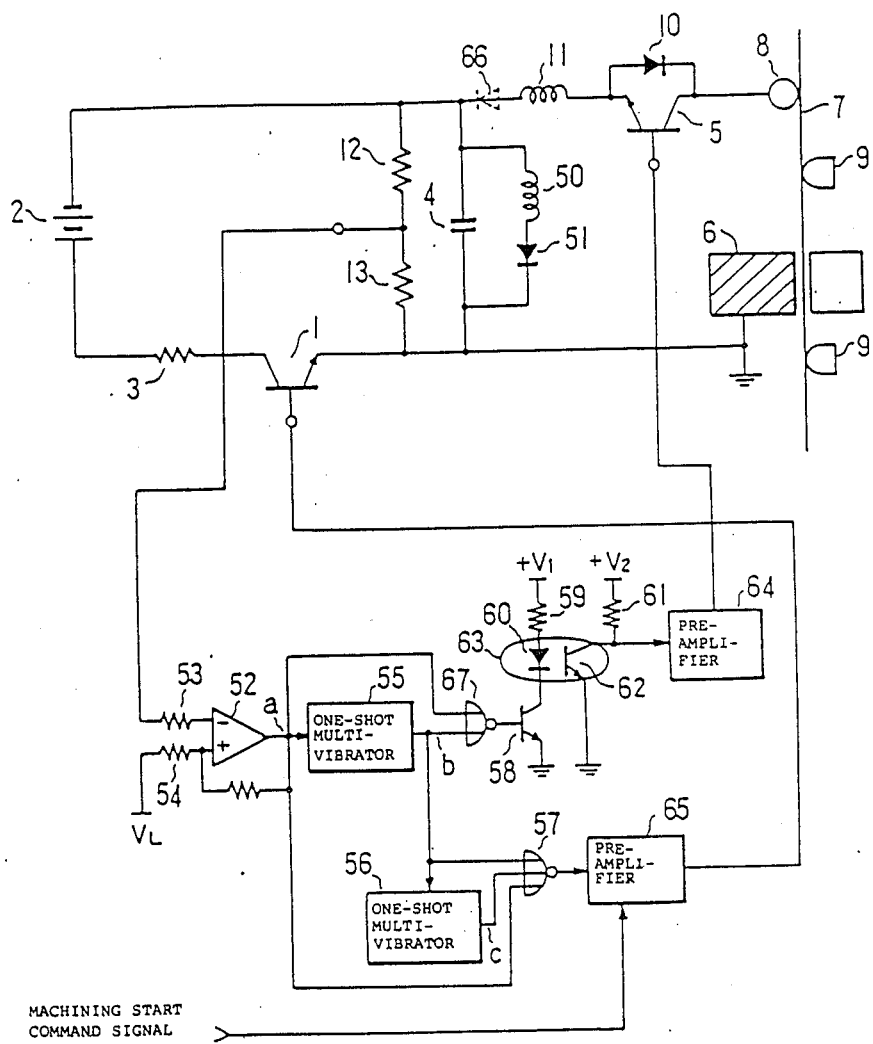
FIG. 5 is a circuit diagram of the principal part of an embodiment of the present invention.

FIG. 5 is a circuit diagram of the principal part of an embodiment of the present invention, in which reference numerals which are the same as those in FIG. 1, indicate like elements. Reference numeral 50 designates an inductance and 51 a diode which are connected in series to each other and connected in parallel to the capacitor 4. Reference numeral 52 identifies a comparator which receives at its − terminal, via a resistor 53, the terminal voltage of the capacitor 4 obtained by the resistors 12 and 13. Comparator 52 receives, at its + terminal, via a resistor 54, a reference voltage $V_L$ which is varied by a means (not shown). The comparator 52 yields a comparison signal a which is a "1" while the terminal voltage $V_C$ of the capacitor 4 is lower than the reference voltage $V_L$. In FIG. 5 55 denotes a one-shot multivibrator which is triggered by the fall of the comparison signal of the comparator 52 from the "1" to the "0" level to produce a pulse b of a predetermined pulse width $T_1$; 56 represents another one-shot multivibrator which is triggered by the fall of the output of the one-shot multivibrator 55 from the "1" to the "0" level to produce a pulse c of a predetermined pulse width $T_2$; 67 represents a NOR circuit which receives the signals a and b; and 57 represents to another NOR circuit which receives the signals a to c. A transistor 58 and a photo coupler 63 made up of a light emitting device 60 connected via a resistor 59 to a positive power source $+V_1$ and a photo detector 62 connected via a resistor 61 to a positive power source $+V_2$ from a voltage level conversion circuit, which compensates for a difference between emitter potentials of the transistors 1 and 5. Reference numerals 64 and 65 indicate preamplifiers.

The preamplifier 65 becomes ready for operation when supplied with a machining start command signal from a means (not shown). The output of the preamplifier 64 is connected to the base of the transistor 5 and the output of the preamplifier 65 is connected to the base of the transistor 1. The above circuits constitute a control circuit of the wire-cut, electric discharge machining power supply unit if the present invention.

Figure 2:
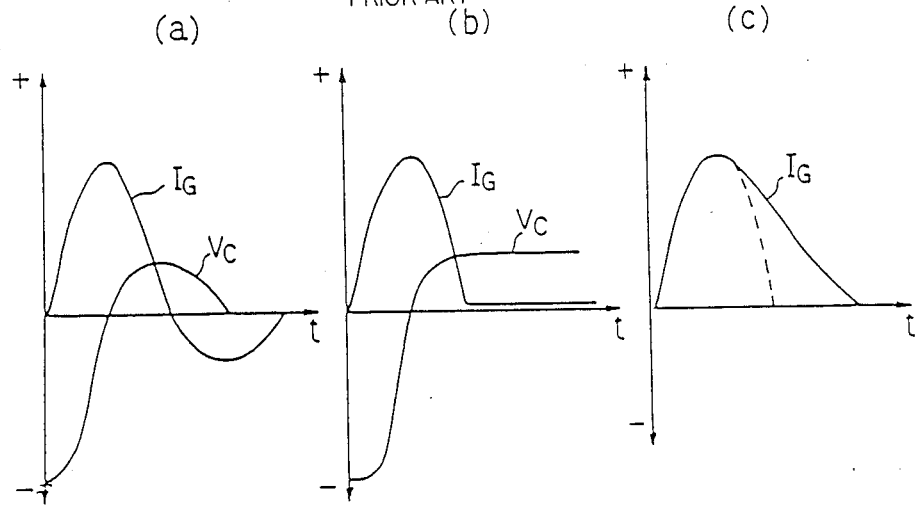
FIGS. 2(a), 2(b) and 2(c) are a series of graphs for explaining the operation of FIGS. 1, 3 and 4.
Figure 3:
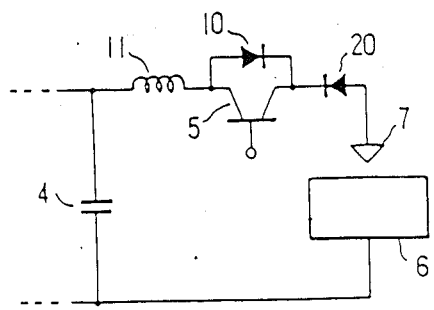
Figure 4:
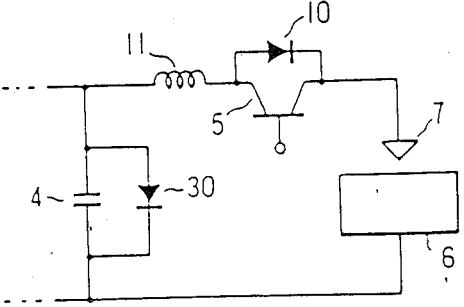
Figure 6:
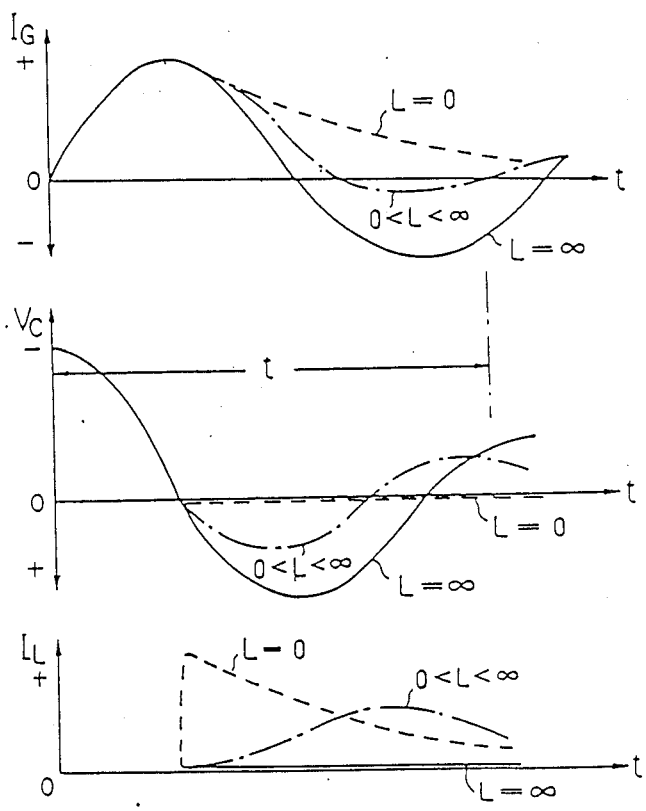
FIGS. 6 and 7 are waveform diagrams for explaining the operation of the embodiment of FIG. 5

FIG. 6 is a series of graphs for explaining the principals of the above embodiment, illustrating, by way of example, temporal variations in the discharge current $I_G$ between the wire electrode 7 and the workpiece 6, the terminal voltage $V_C$ of the capacitor 4 and the current $I_L$ flowing in the series circuit of the inductance 50 and the diode 51 in cases where the value L of the inductance 50 in FIG. 5 is selected such that L=0, $0 < L < \infty$ and $L = \infty$, respectively. As shown in FIG. 6, when the value of the inductance 50 is zero, the discharge current $I_G$ varies in such a form that it drags on as in the case of FIG. 2(c) and when the value of the inductance 50 is infinite, the − direction component of the discharge current $I_G$ becomes very large, but when the value of the inductance 50 is set appropriately, the pulse width of the + direction component of the discharge current $I_G$ does not so much spread and the − direction component becomes small. This embodiment has been designed based on this point.

Figure 7:
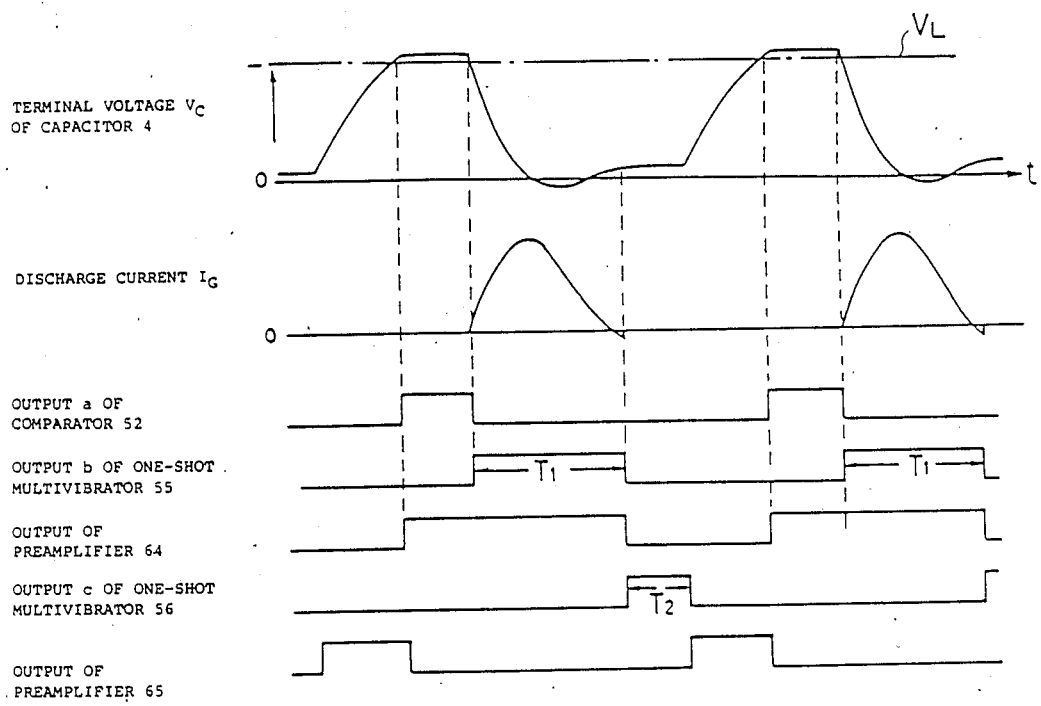

FIG. 7 is a series of waveform diagrams illustrating, by way of example, signal waveforms occuring at respective parts of the unit shown in FIG. 5 during its operation. When the terminal voltage of the capacitor 4 reaches a predetermined value set by the reference voltage $V_L$, since the comparison signal a of the comparator 52 goes to a "1", the output of the NOR cirit 57 goes to a "0" and the output of the preamplifier 65 also goes to a "0", turning OFF the transistor 1 to stop the charging operation. At this time, the outputs of the NOR circuit 67, the photo coupler 63 and the preamplifier 64 go to a "0", a "1" and a "1", respectively, turning ON the transistor 5. Upon turning-ON the transistor 5, the terminal voltage of the capacitor 4 is applied across the discharge gap between the wire electrode 7 and the workpiece, and when the gap insulation is destroyed, the discharge current flows across the discharge gap.

When the terminal voltage of the capacitor 4 becomes smaller than the predetermined value and approaches 0 V as a result of the discharge, the comparison signal a of the comparator 52 goes to a "0", by which the one-shot multivibrator 55 is triggered to output the pulse b of pulse width $T_1$. The pulse width $T_1$ is set to be equal to the period from the time of the start of the discharge to the time when the terminal voltage $V_C$ of the capacitor 4 becomes nagative and the discharge current $I_G$ becomes substantially zero (i.e., the period t in FIG. 6). Accordingly, when the output b of the one-shot multivibrator 55 goes to a "0" and the outputs of the NOR circuit 67, the photo coupler 63 and the preamplifier 64 go to a "1", a "0" and a "0", respectively, to turn OFF the transistor 5, the terminal voltage $V_C$ of the capacitor 4 becomes negative and the discharge current $I_G$ becomes substantially zero. By turning OFF the transistor 5 when the terminal voltage of the capacitor 4 is negative, as mentioned above, the next charging of the capacitor 4 can be effected efficiently, and by turning OFF the transistor 5 when the discharge current $I_G$ is substantially zero, it is possible to omit or miniaturize the diode 10 for protecting the transistor 5 from a reverse breakdown voltage.

When the output of the one-shot multivibrator 55 goes to a "0", the one-shot multivibrator 56 is triggered, providing the pulse c of the pulse width $T_2$ to the NOR circuit 57. Accordingly, at the instant when the output of the one-shot multivibrator 56 goes to a "0" (at this time, the signals a and b are both "0s"), the output of the NOR circuit 57 goes to a "1", and the transistor 1 is turned ON again by the output of the preamplifier 65, thereby starting the charging of the capacitor 4. The output pulse width $T_2$ of the one-shot multivibrator 56 is settable from the outside using a means (not shown), and by changing the pulse width $T_2$, the number of repetitions of discharge per unit time is varied and the cutting energy can be controlled.

With the value of the inductance 50 being selected to be 0.2 and about 1 $\mu$H when the capacitance of the capacitor 4 is 1 and 0.2 $\mu$F and the inductance 11 is 1 $\mu$H, good results could be obtained. Since the adjustment of the value of the inductane 50 is delicate, it is desirable, for completely suppressing the − direction component of the discharge current, that a diode 66 be inserted in such a direction as to be reverse in polarity from the − direction component, as indicated by the broken line in FIG. 5.

Figure 8:
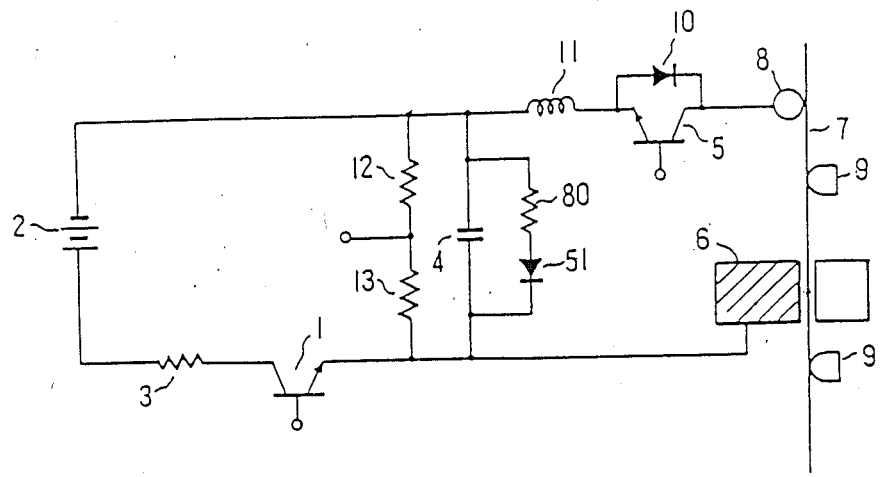
FIG. 8 is a circuit diagram of the principal part of another embodiment of the present invention.

FIG. 8 is a circuit diagram of the principal part of another embodiment of the present invention, in which reference numerals which are the same as those in FIGS. 1 and 5 indicate the same elements. Reference numeral 80 designates a resistor. In this embodiment a series circuit of the resistor 80 and the diode 51 is connected in parallel to the capacitor 4.

Figure 9:
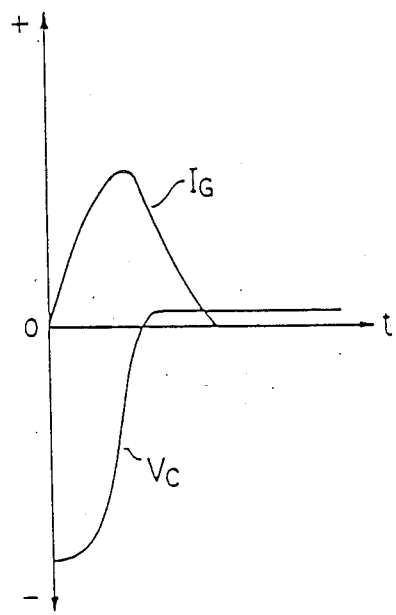
FIG. 9 is a waveform diagram for explaining the operation of the embodiment of FIG. 8.

With such an arrangement, stored charges of the capacitor 4 are discharged to the discharge gap and when an inverted voltage is applied to the capacitor 4, since it is a forward voltage relative to the diode 80, a part of the discharge current flows via the diode 51 and the resistor 80, and since the energy of the discharge current is rapidly attenuated by the resistor 80, the charging of the capacitor 4 in the reverse polarity is very slight. Further, the terminal voltage of the capacitor 4 varies, as indicated by $V_C$ in FIG. 9, and the discharge current varies, as indicated by $I_G$ in FIG. 9, and it becomes small in pulse width. It is preferable that when the stray inductance 11 is 1 $\mu$H, the value of the resistor 80 be 0.2 $\Omega$ if the capacitance of the capacitor 4 is 1 $\mu$F, and 1 $\Omega$ if the capacitance of the capacitor 4 is 0.2 $\mu$F. Good results can be obtained when the product of the capacitance value of the capacitor 4 and the resistance value of the resistor 80 is substantially constant.

As described above, according to the present invention, in the wire-cut, electric discharge machining power supply unit which charges a capacitor by a DC power source via a switching element, and discharges the stored charges of the capacitor between a workpiece and a wire electrode via another switching element, a series circuit of an impedance element other than a capacitance and a diode, is connected in parallel to the capacitor. The diode is backward in direction with respect to the voltage of the DC power source, but when the capacitor voltage becomes positive, a voltage is applied via the impedance element to the diode in the forward direction. This permits the reduction of charges which are stored in the capacitor in the positive polarity, the reduction of the − direction component of the discharge current, the reduction of the − direction component of the discharge current and the reduction of the pulse width of the + direction component. Accordingly, the cutting speed can be increased.

We claim:

1. A wire-cut, electric discharge machining power supply unit for use in machining a workpiece, comprising:
- a DC power source;
- a first switching element coupled to said DC power source;
- a capacitor coupled to said DC power source and said first switching element, said capacitor being charged by said DC power source via said first switching element;
- a second switching element coupled to said capacitor;
- a wire electrode coupled to said second switching element and positioned adjacent the workpiece, the stored charges of said capacitor being discharged between the workpiece and said wire electrode via said second switching element; and
- a series circuit, consisting of a diode and an inductance, connected in parallel to said capacitor, said diode being connected in a backward direction relative to the polarity of the charged voltage of said capacitor.

2. A wire-cut, electric discharge machining power supply unit for use in machining a workpiece, comprising:
- a power source;
- a first switching element coupled to said power source;
- a capacitor coupled to said power source and said first switching element, said capacitor being charged by said power source via said first switching element;
- a second switching element coupled to said capacitor;
- a wire electrode coupled to said second switching element and positioned adjacent the workpiece, the stored charges of said capacitor being discharged between the workpiece and said wire electrode via said second switching element;
- control means for controlling the switching of said first and second switching elements; and
- a series circuit connected in parallel with said capacitor, said series circuit consisting of and inductance and a diode connected to said inductance, said diode being connected in a backward direction relative to the polarity of the charged voltage of said capacitor.

3. A wire-cut, electric discharge machining power supply unit as set forth in claim 2, wherein said power source comprises a DC power source.

4. A wire-cut, electric discharge machining power supply unit as set forth in claim 3, wherein said first an second switching elements comprise transistors.

5. A wire-cut, electric discharge machining power supply unit as set forth in claim 2, wherein said first and second switching elements comprise transistors.

* * * * *

UNITED STATES PATENT AND TRADEMARK OFFICE
CERTIFICATE OF CORRECTION

PATENT NO. : 4,681,997
DATED : JULY 21, 1987
INVENTOR(S) : MICHIYA INOUE ET AL.

It is certified that error appears in the above-identified patent and that said Letters Patent is hereby corrected as shown below:

Col. 1, line 33, "$V_C$in" should be --$V_C$ in--;

line 34, "On this account," should be --As a result,--;

line 39, "$I_G$in" should be --$I_G$ in--;

line 43, "isert" should be --insert--.

Col. 2, line 51, "5 55" should be --5, 55--;
line 60, delete "to".

Col. 3, line 8, "if" should be --of--;
line 34, "circit" should be --circuit--;
line 61, "$I_G$becomes" should be --$I_G$ becomes--.

Col. 4, line 46, "$\Omega$if" should be --$\Omega$ if--.

Col. 6, line 14, "and" should be --an--;
line 23, "an" should be --and--.

Signed and Sealed this

Twelfth Day of January, 1988

Attest:

DONALD J. QUIGG

Attesting Officer

Commissioner of Patents and Trademarks